US008087706B2

(12) United States Patent
Karlander et al.

(10) Patent No.: US 8,087,706 B2
(45) Date of Patent: Jan. 3, 2012

(54) BUMPER BEAM

(75) Inventors: Lars Karlander, Lulea (SE); Henrik Kohkoinen, Lulea (SE)

(73) Assignee: Gestamp Hardtech AB, Lulea (SE)

( * ) Notice: Subject to any disclaimer, the term of this patent is extended or adjusted under 35 U.S.C. 154(b) by 744 days.

(21) Appl. No.: 11/919,565

(22) PCT Filed: May 23, 2006

(86) PCT No.: PCT/SE2006/000596
§ 371 (c)(1), (2), (4) Date: Oct. 30, 2007

(87) PCT Pub. No.: WO2006/126940
PCT Pub. Date: Nov. 30, 2006

(65) Prior Publication Data
US 2010/0013249 A1 Jan. 21, 2010

(30) Foreign Application Priority Data
May 25, 2005 (SE) ....................................... 0501174

(51) Int. Cl.
B60R 19/02 (2006.01)
(52) U.S. Cl. ......................................... 293/102; 293/154
(58) Field of Classification Search .................. 293/102, 293/114, 150, 154
See application file for complete search history.

(56) References Cited

U.S. PATENT DOCUMENTS

| 3,924,888 | A | * | 12/1975 | Butcher et al. ................. 293/150 |
| 5,462,325 | A | * | 10/1995 | Masuda et al. ................. 293/102 |
| 5,997,058 | A | * | 12/1999 | Pedersen ........................ 293/102 |
| 6,851,731 | B2 | | 2/2005 | Janssen |
| 7,044,515 | B2 | * | 5/2006 | Mooijman et al. ............. 293/120 |
| 7,399,013 | B2 | * | 7/2008 | Lutke-Bexten et al. ....... 293/102 |
| 7,611,175 | B2 | * | 11/2009 | Tornberg ........................ 293/102 |
| 7,625,036 | B2 | * | 12/2009 | Cormier et al. ........... 296/187.03 |
| 7,665,777 | B2 | * | 2/2010 | Mellis et al. ................... 293/102 |
| 2004/0007886 | A1 | * | 1/2004 | Hallergren ..................... 293/102 |
| 2006/0028032 | A1 | * | 2/2006 | Henseleit ....................... 293/102 |
| 2009/0066095 | A1 | * | 3/2009 | Karlander ...................... 293/102 |
| 2009/0273197 | A1 | * | 11/2009 | Muskos .......................... 293/132 |

FOREIGN PATENT DOCUMENTS

| DE | 19509541 | 9/1996 |
| SE | 523502 | 4/2004 |
| WO | 9811267 | 3/1998 |

* cited by examiner

*Primary Examiner* — Jason S Morrow
(74) *Attorney, Agent, or Firm* — Mark P. Stone

(57) ABSTRACT

A bow-formed bumper beam for a vehicle has a hat profile with a central flange (11), two webs (12, 13), and side flanges (14, 15). The beam has fastening portions (20, 21) at its sides where the side flanges form fastening areas (30-33) for fastening the beam to the vehicle with the central flange facing outwards. In the area between the fastening areas, the side flanges have bent edges (26, 27) and in association with the beginning of the bent edges, they have transverse dents (29). These dents will easily be flattened out when the beam is bent in a collision so that the local tension in these sensitive areas is reduced. Thereby, the risk of cracking is reduced.

3 Claims, 6 Drawing Sheets

BUMPER BEAM

TECHNICAL FIELD

This invention relates to a bumper beam for a vehicle, which has a hat profile with a central flange, two webs, and side flanges that have bent edges along a portion of their length.

PRIOR ART

Bumper beams with a hat profile often have bent edges along a major part of their length. This is true in particular for bumper beams that have a low profile height and their crowns outward directed. The side flanges are often used for fastening to the vehicle or to crash boxes which are fastened to the vehicle. The side flanges have then usually no bent edges at their fastening portions whereas they have bent edges all the way between the fastening portions.

OBJECT OF INVENTION AND BRIEF DESCRIPTION OF THE INVENTION

It is an object of the invention to provide a bumper beam of this kind that has good energy absorption and reduced risk of cracking in case of a collision. This is fulfilled when the side flanges have transverse dents in association with the beginning of the bent edges of the side flanges. These dents can easily flatten out when the beam is bent in a collision so that the local tension in these sensitive areas of the side flanges is reduced, thereby reducing the risk of cracking.

Preferably but not necessarily, the hat beam has an open cross section, that is, it has no cover and no other elements that link its side flanges together.

BRIEF DESCRIPTION OF THE DRAWINGS

The figures shows a bumper beam that is an example of embodiment of the invention.

Figure 3:
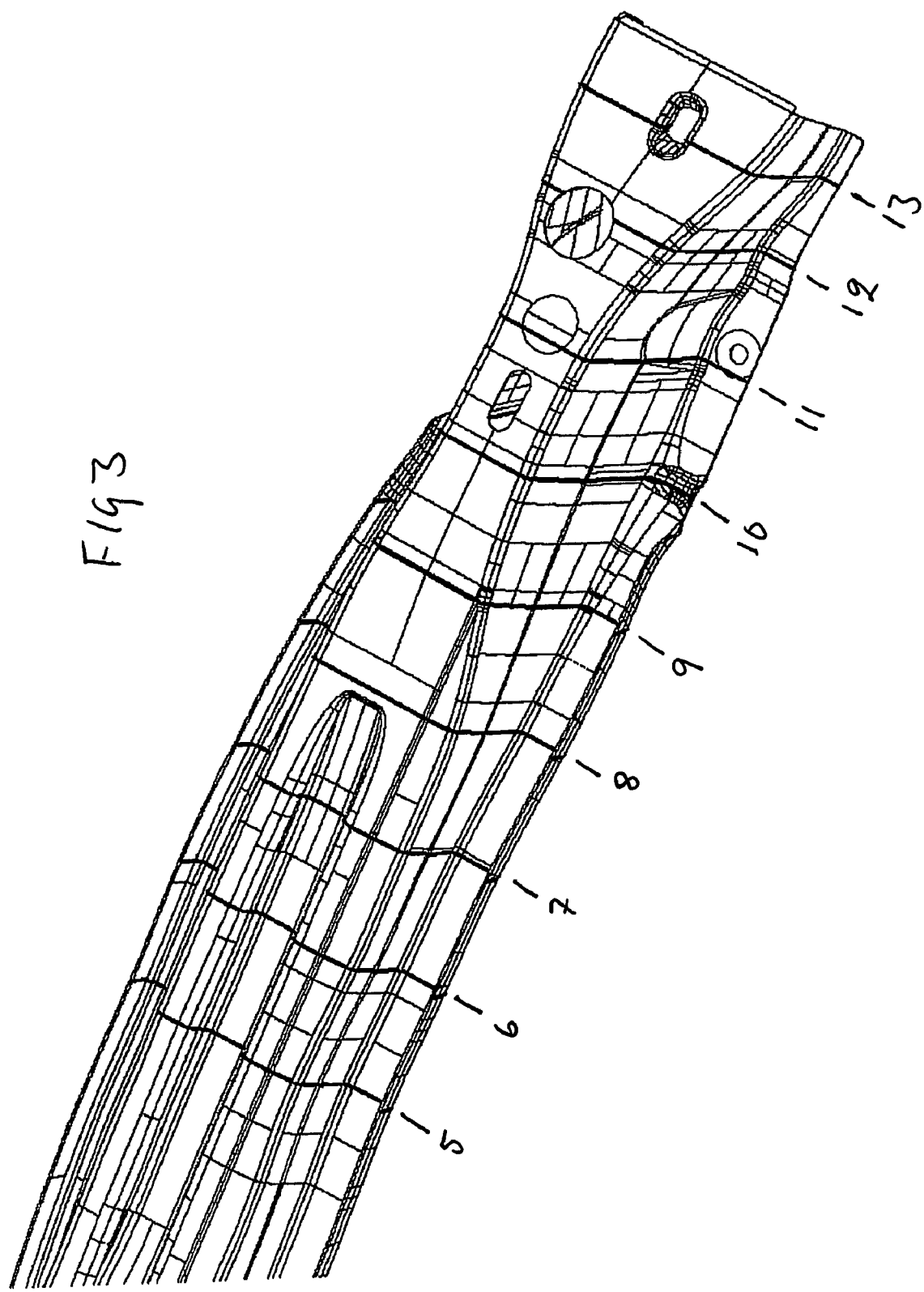
FIG. 3 is a perspective view of one end of the bumper beam of FIG. 1.

The FIGS. 5-13 are cross sections taken as indicated by the respective lines 5-13 in FIG. 3.

BRIEF DESCRIPTION OF A SHOWN AND PREFERRED EMBODIMENT

The bumper beam shown in the figures is made of metal. It can suitably be made of hardenable sheet steel that is hot stamped and hardened in a single step in the so called press hardening process. The steel is high strength steel and it may have a yield point over 900 Mpa (N/mm$^2$), for example over 1100 or over 1200 Mpa.

The bumper beam is an open hat beam (it has a hat profile) with a central flange 11, two webs 12, 13 and two side flanges 14, 15, and it has an open cross section. The webs and the central flange form the crown of the hat profile. The central portion of the central flange has an elongate stiffener in the form of a depression 16 that is at least 30 cm long. It can extend over at least a fifth of the length of the bumper beam. This depression can be deeper than shown and in an extreme case, it can be so deep that the beam will have the profile of a double hat Alternatively, two narrower depressions can be used instead of one wider.

The beam has two fastening portions 20, 21, in which the side flanges have flat portions 30-33 and lie in one and the same plane and have holes 22, 23, 24 so that they can be fastened by screws to flat fastening plates on the vehicle. The webs 12, 13 have their highest portions in association with the fastening portions and lowest portions in its centre as can be seen from the cross sections 4-13. The profile height of the middle portion should be less than ⅔ of the highest profile height and preferable less than half thereof.

The side flanges 16, 17 have bent edges 26, 27 all the way between the fastening portions 20, 21, whereas the side flanges have no bent edges at their fastening portions. The bent edges make the beam stiffer and provide better deformation properties. The profile of the beam can be seen from the transverse sections 5-13 which are shown in one and the same scale and are self explanatory. The webs 12, 13 are somewhat convex in order to control the deformation. In the shown example of a bumper beam in accordance with the invention, the beam is somewhat asymmetric in cross section, which is due to the actual vehicle design and is not described in more detail. A number of holes and recesses depend also on the vehicle design and are not described in detail. They can for example be adapted to permit for a towing eyelet to pass the beam or be adapted for the positioning of the beam at its mounting.

Figure 4:
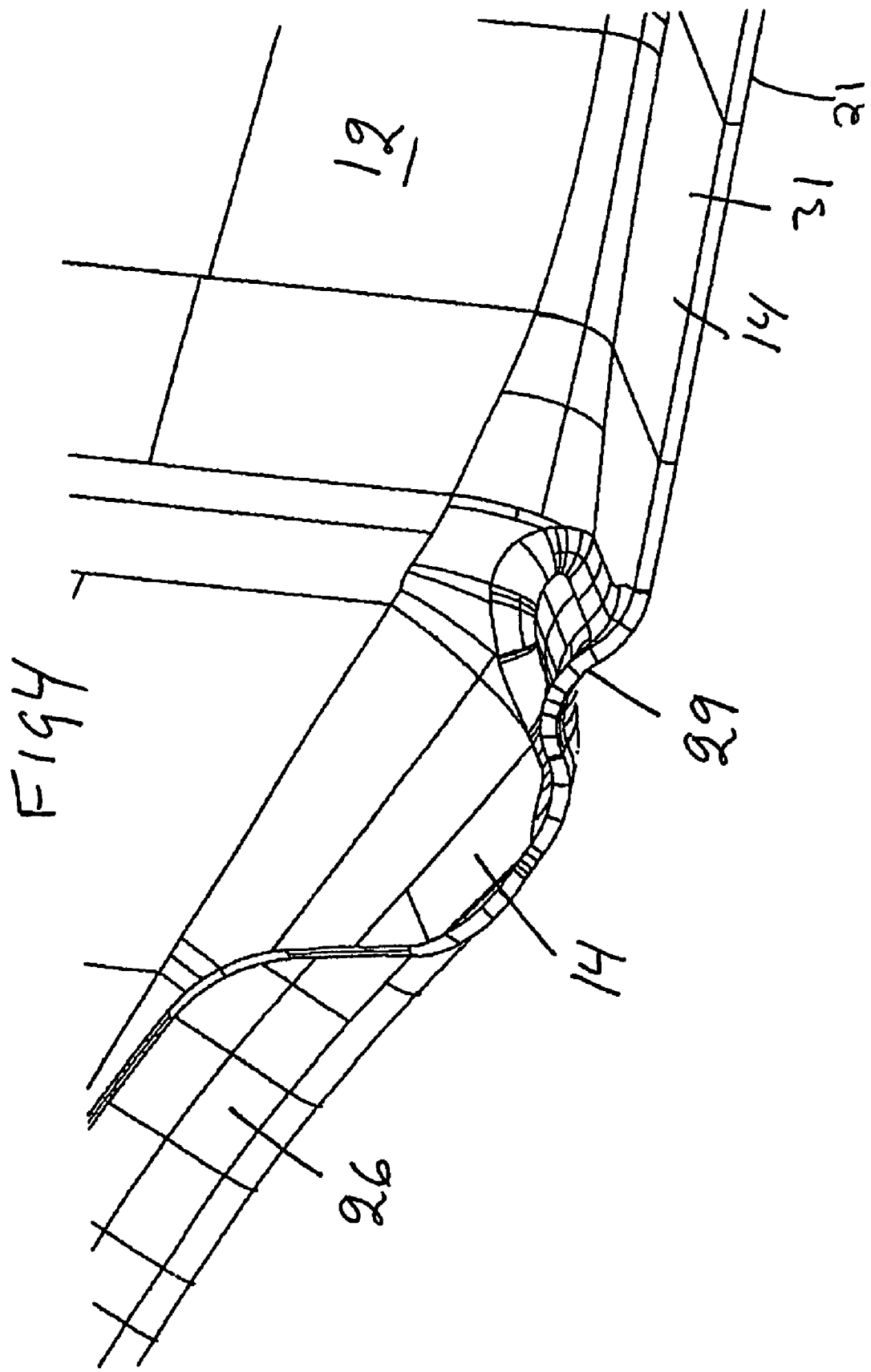
FIG. 4 shows, enlarged and in perspective, a small part of the bumper beam around the line 10 in FIG. 3.
Figure 5:
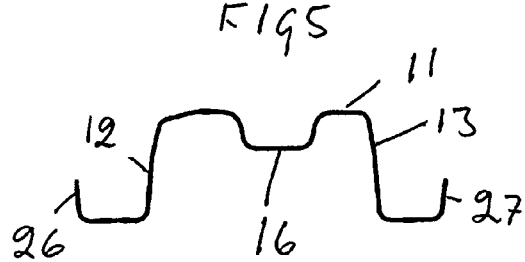
Figure 6:
Figure 7:
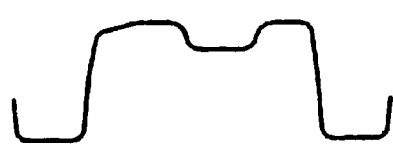
Figure 8:
Figure 9:
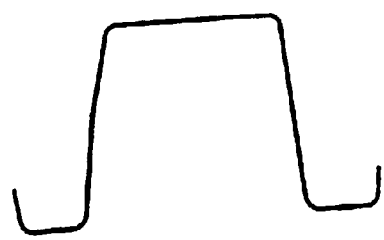
Figure 10:
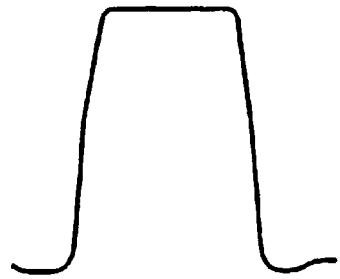
Figure 11:
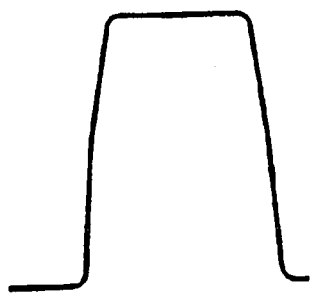
Figure 12:
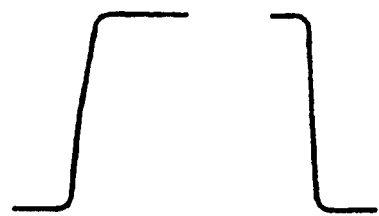
Figure 13:

As best seen from FIG. 4, in all the transitions between the flat portions 14, 15 of the side flanges and the central portions of the side flanges with bent edges 26, 27, the side flanges have transverse dents 29. These dents 29 in association with the beginning of the bent edges can readily be flattened when the beam is bent at a collision and they reduce therefore the local tension in these sensitive portions of the side flanges and thereby they reduce the tendency of cracking. The bumper beam may have another design than the shown one, but dents 29 in association with the area of the beginning of a bent edge will provide the same function regardless of the actual design of the beam.

Figure 1:
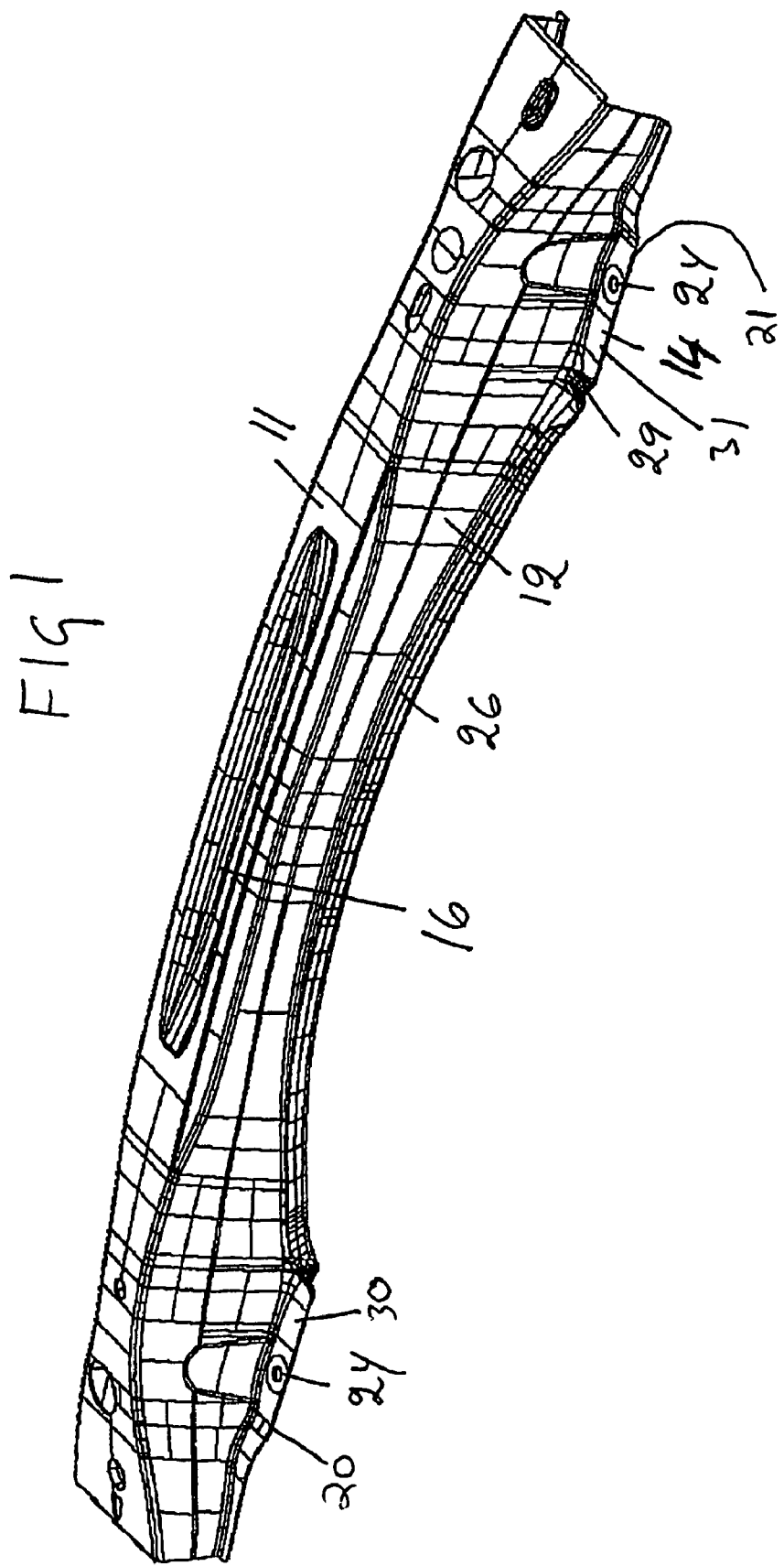
FIG. 1 is a perspective view of the bumper beam of FIG. 1.
Figure 2:
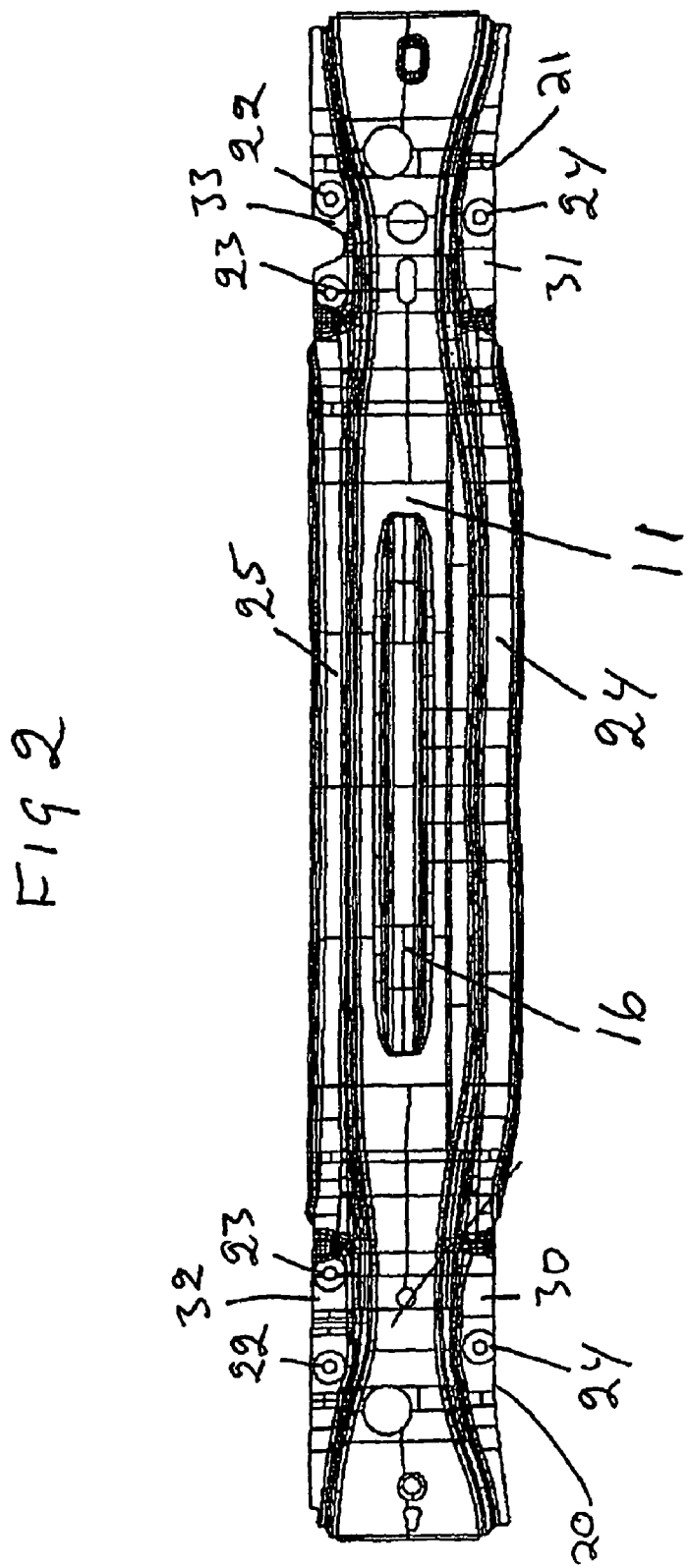
FIG. 2 is a side view, somewhat in perspective, of the bumper beam of FIG. 1.

As best illustrated by FIG. 1, the dent 29 is defined on the side flange 14 in close proximity to the fastening area 31.

Buckling of the bumper beam is more harmful the closer to the centre it is since the moment at midspan is the highest. If the profile is strong and does not bend, a thin pole will buckle the profile and result in a fast collapse. If the profile is more resilient by having a profile height that is reduced towards the middle of the beam, the buckling tendency will be reduced and the buckling will be delayed so that the motion of the beam towards the vehicle will be reduced. The depression 16 increases the strength against local buckling of the profile in the middle portion, but it does not hinder yielding. In a crash against a barrier, the beam will have reduced properties, but in accordance with the invention, an optimum compromise between the properties for various kinds of crashes will be achieved and better properties will be achieved generally.

The beam described above is made of hot stamped and hardened sheet steel, suitably in boron alloyed steel. Alternatively, it can be manufactured by cold forming of high-strength cold-forming steel. It need not necessarily be a functionally open profile as shown but it may have elements that link together its side flanges. The crown may be adjacent the vehicle instead of being outward directed. The beam may also be made in another metal than steel, for example aluminium.

The invention claimed is:

1. A bumper beam for a vehicle, said bumper beam having a hat profile with a central flange (11), two webs (12, 13), and side flanges (14, 15) extending from said webs, at least a first portion of said side flanges extending along a substantially longitudinal plane said side flanges having bent edges along a second portion of the length thereof, characterized in that the side flanges (14, 15) have transverse dents (29) in association with the beginning of said bent edges (26, 27), said dents oriented substantially transverse to the longitudinal plane along which said first portion of said side flanges extend so as to be able to flatten out if the side flanges are tensioned in a collision.

2. A bumper beam according to claim 1, characterized in that the side flanges form fastening areas (30-33) at both ends of the beam for fastening of the beam to the vehicle with the central flange (11) of the beam directed outwards, the side flanges being without said bent edges at the fastening areas, wherein said bumper beam has said bent edges between the fastening areas.

3. A bumper beam for a vehicle, said bumper beam having a hat profile with a central flange (11), two webs (12, 13), and side flanges (14, 15) that have at least one fastening area for fastening said bumper beam to said vehicle, said at least one fastening area being provided on a portion of said side flanges which extend along a substantially longitudinal plane, characterized in that the side flanges (14, 15) have at least one transverse dent (29) proximate to said at least one fastening area, said at least one dent oriented substantially transverse to the longitudinal plane along which said portion of said side flanges extend so as to be able to flatten out if the side flanges are tensioned in a collision.

* * * * *

UNITED STATES PATENT AND TRADEMARK OFFICE
CERTIFICATE OF CORRECTION

| | | |
|---|---|---|
| PATENT NO. | : 8,087,706 B2 | Page 1 of 1 |
| APPLICATION NO. | : 11/919565 | |
| DATED | : January 3, 2012 | |
| INVENTOR(S) | : Lars Karlander and Henrik Kohkoinen | |

It is certified that error appears in the above-identified patent and that said Letters Patent is hereby corrected as shown below:

Column 3, Line 6 (Claim 1, Line 5): After "plane", insert -- , --.

Signed and Sealed this
Sixth Day of March, 2012

David J. Kappos
*Director of the United States Patent and Trademark Office*